May 11, 1948. J. F. CHALUPA 2,441,135
TURBINE APPARATUS
Filed July 9, 1943 2 Sheets-Sheet 1
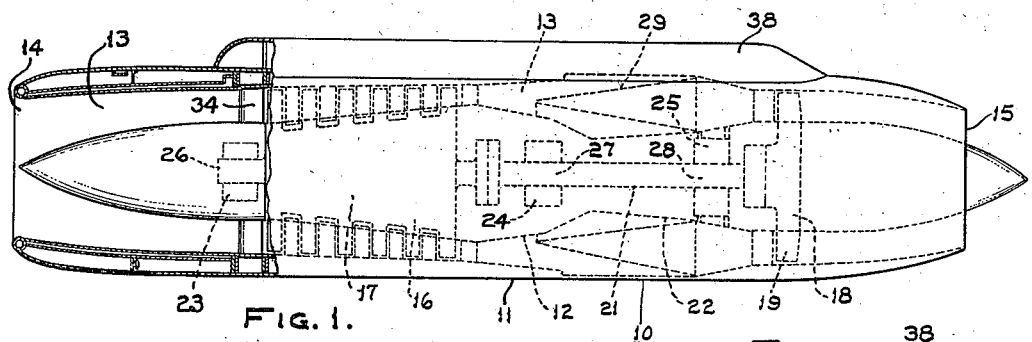
Fig. 1.
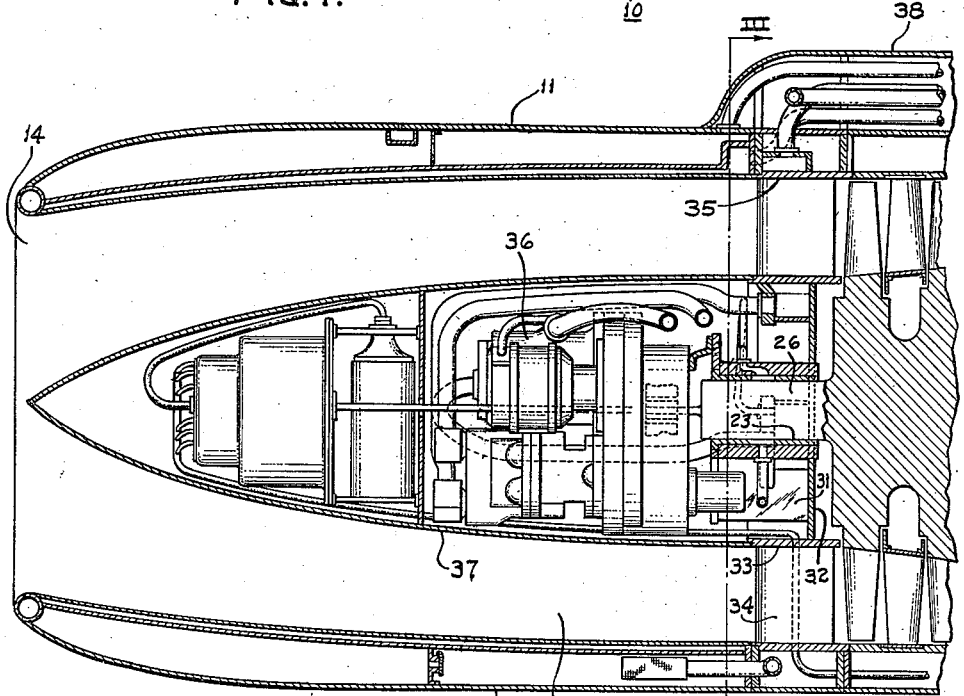
Fig. 2.
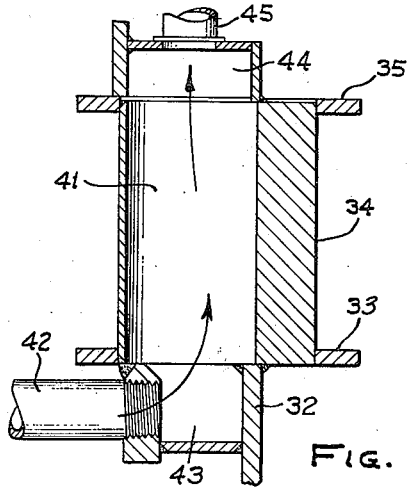
Fig. 5.
Fig. 4.
INVENTOR
JOSEPH F. CHALUPA.
BY A. B. Reeves
ATTORNEY

INVENTOR
JOSEPH F. CHALUPA.

Patented May 11, 1948

2,441,135

UNITED STATES PATENT OFFICE 2,441,135

TURBINE APPARATUS

Joseph F. Chalupa, Norwood, Pa., assignor to Westinghouse Electric Corporation, East Pittsburgh, Pa., a corporation of Pennsylvania Application July 9, 1943, Serial No. 494,007

1 Claim. (Cl. 60—41)

This invention relates to power plants and particularly to an improved compressor for a gas turbine, and it has for an object to provide an improved device of the character set forth.

It is another object of the invention to provide an improved compressor having suction guide vanes which serve also to support the compressor rotor shaft.

It is a further object of the invention to provide an improved compressor having an inlet passage aligned with and coaxial with the blade passage of the compressor and providing, with the blade passage, a continuous, substantially straight-through flow passage for the gaseous medium to be compressed.

These and other objects are effected by the invention as will be apparent from the following description and claim taken in connection with the accompanying drawings, forming a part of this application, in which:

Fig. 1 is a side elevational view, with parts broken away, of a gas turbine power plant in which the present invention has been incorporated;

Fig. 2 is a vertical, longitudinal sectional view of the left end of the plant shown in Fig. 1;

Fig. 4 is a transverse sectional view of one of the guide vanes taken substantially on the line IV—IV of Fig. 3; and Fig. 5 is a longitudinal sectional view of one of the guide vanes.

Figure 3:
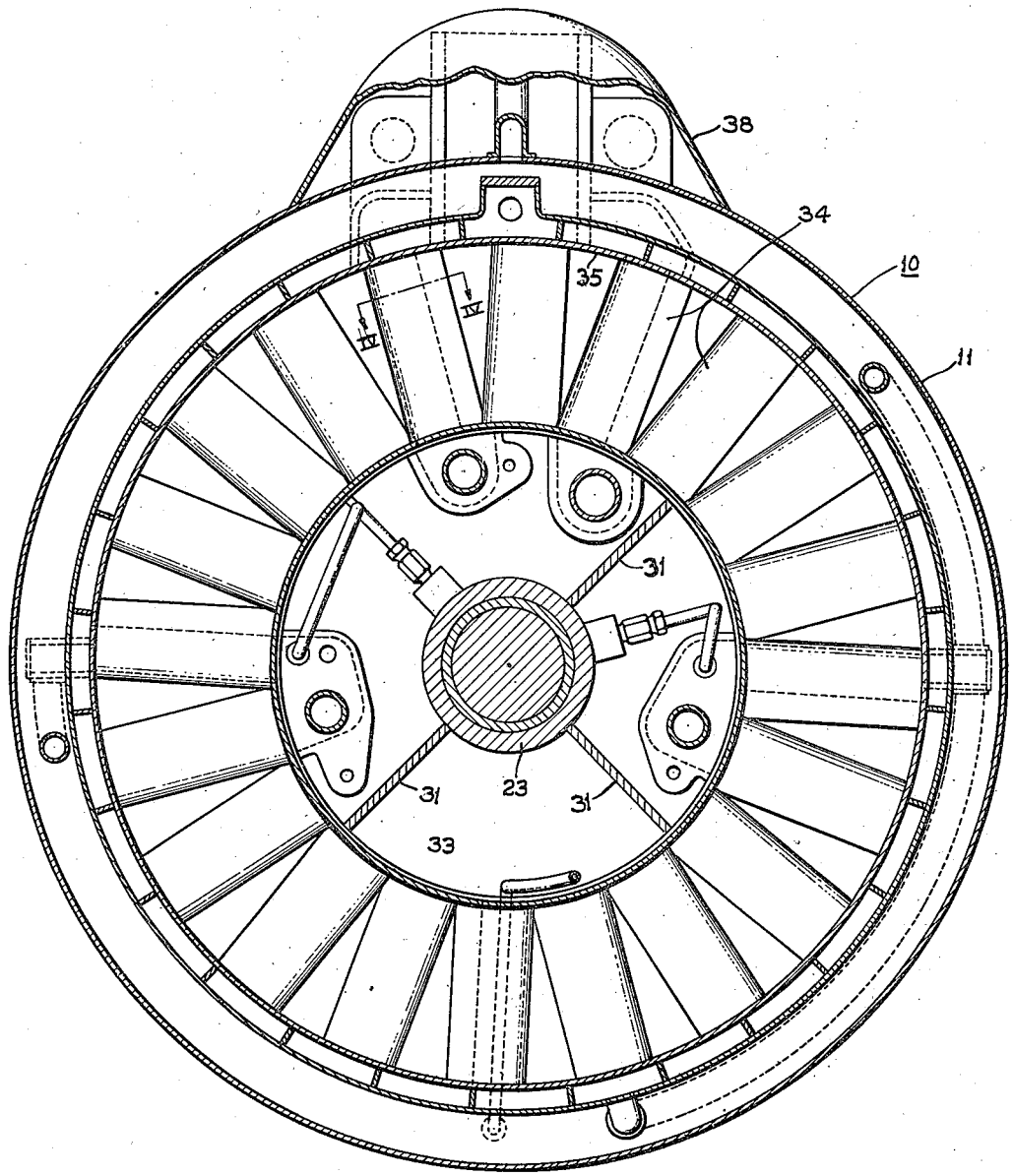
Fig. 3 is a transverse sectional view taken substantially on the line III—III of Fig. 2.

In the drawings, there is shown a gas turbine power plant, generally indicated 10, which comprises a substantially cylindrical outer casing structure 11 having a rounded taper toward each end for streamlining. A composite core structure, generally indicated at 12, is supported internally of the casing structure by the latter and cooperates therewith to define an annular flow passage 13 extending from the inlet or forward end 14 of the plant to a propulsion nozzle 15 at the exit or discharge end thereof. The arrangement is such that the flow passage is substantially straight-through axially of the casing structure, involving a minimum of change in direction or sudden change in flow area.

The composite core structure 12 includes a rotor 16 of an axial-flow compressor 17 and a rotor 18 of a gas turbine 19 spaced rearwardly from the compressor. The spaced rotors are connected by a shaft 21 enclosed by an inner casing structure 22. The shaft and rotors are journaled in bearings 23, 24 and 25, carried by the casing structure, which bearings maintain the core structure in coaxial relation with and in a predetermined longitudinal position with respect to the casing structure. To this end, the compressor rotor has a journal portion 26 extending forwardly thereof, and the connecting shaft 21 has bearing portions 27 and 28. At least one of the bearing portions or journals and its bearing is designed to withstand axial thrust in either direction as well as provide radial support for the core structure.

The power plant includes a combustion apparatus 29 mounted in the annular flow passage 13 between the compressor and turbine rotors 16 and 18, respectively. This combustion apparatus may be of any desired construction and is preferably like that shown in the copending patent application of Stewart Way et al., Serial No. 511,468, filed on November 23, 1943, and assigned to the assignee of the present invention.

In brief, the operation of the plant is as follows: Air enters at the intake end 14, is compressed by the compressor 17, the compressed air entering the combustion apparatus 29 where it mixes with atomized fuel. The air and fuel mixture is burned in the combustion apparatus and the resulting hot motive fluid comprising excess air and products of combustion flows from the rear of the combustion apparatus to the turbine 19. The hot motive fluid is discharged against the blades of the turbine rotor which drives the compressor 17 and auxiliary apparatus, shown in Fig. 2, and referred to hereinafter. The plant is particularly adapted for use in propelling aircraft, in which case the spent gases leaving the turbine rotor are discharged through the propulsion nozzle 15 at the rear end of the plant at a jet for propelling the aircraft.

The present invention is particularly concerned with the construction of the fore part of the plant and compressor and the manner of supporting the front bearing 23, as well as auxiliary equipment, as will appear hereinafter.

The bearing 23 is mounted in a hub structure, including a ring 33 joined by radial webs 31 and an end plate 32 to the bearing sleeve. The hub structure, in turn, is supported from the outer casing structure by means of a plurality of circumferentially-spaced, hollow guide vanes 34 fixed at their inner ends to the ring 33 of the hub structure and at their outer ends to an inner wall 35 of the casing structure 11, as shown particularly in Fig. 3. The vanes 34, in addition to supporting the hub structure, direct the air entering the plant at the proper angle to the initial stage of the compressor 17 and also serve as conduits for pipes and wiring leading from auxiliary apparatus, generally indicated at 36, carried by the hub structure and mounted within a fairing cone 37 ahead of the compressor.

The fairing cone 37 is secured to the ring 33 of the hub structure and projects forwardly toward the inlet 14 of the power plant. The cone 37 and hub ring 32, together with the outer casing structure 11, define an annular flow passage which guides the air entering the inlet 14 in a smooth, straight-through path to the compressor blade passage.

The auxiliary apparatus 36, including ignition apparatus and a fuel oil pump for the combustion apparatus as well as a lubricating oil pump for the bearings, is mounted within the fairing cone and driven from the forwardly-projecting portion 26 of the compressor rotor shaft. Oil pipes and electrical wires for the pumps and ignition apparatus are threaded through the hollow guide vanes 34 and extend into a housing 38 formed in the outer casing structure for connection to their respective bearings, fuel nozzles, spark plugs and the like.

The hollow guide vanes 34 may be made in any suitable manner, as by forging from solid blocks of metal and subsequently drilling holes therethrough for the reception of the oil pipes and wiring, or preferably, by forming the blades of sheet metal and welding as shown at 39 in Fig. 4.

As shown in Fig. 5, instead of running oil from the pumps through pipes in the guide vanes, the longitudinal openings 41 through the guide vanes may themselves serve as a pipe. In this figure, it will be noted that a pipe 42, which may be connected to a pump in the fairing cone, opens into a compartment 43 in communication with the interior of the guide vane, and that the outer end of the vane opens into a compartment 44 which in turn has a pipe 45 leading therefrom which extends into the housing 38.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claim.

What is claimed is:

In a gas turbine power plant provided with component and/or accessory equipment driven thereby and essential to its operation and wherein an axial-flow compressor and turbine rotor aggregate is arranged within a stator casing, a fairing cone and bearing unit with the bearing cooperating with a journal portion of the rotor aggregate at the forward end of the compressor, compressor inlet guide vanes for supporting said unit from the casing, said fairing cone housing said component and/or accessory equipment and cooperating with the casing to provide an annular passage for supplying air from the atmosphere to the inlet guide vanes, means utilizing the outer end of said journal portion to drive the component and/or accessory equipment, and passages formed in guide vanes to accommodate flow of medium from said component and/or accessory equipment to the casing.

JOSEPH F. CHALUPA.

REFERENCES CITED

The following references are of record in the file of this patent:

UNITED STATES PATENTS

| Number | Name | Date |
| --- | --- | --- |
| 1,407,889 | Schmidt | Feb. 28, 1922 |
| 1,518,501 | Gill | Dec. 9, 1924 |
| 2,024,274 | Campini | Dec. 17, 1935 |
| 2,050,349 | Lysholm | Aug. 11, 1936 |
| 2,085,761 | Lysholm | July 6, 1937 |
| 2,257,982 | Seippel | Oct. 7, 1941 |
| 2,280,835 | Lysholm | Apr. 28, 1942 |
| 2,298,576 | McElroy et al. | Oct. 13, 1942 |
| 2,326,072 | Seippel | Aug. 3, 1943 |
| 2,379,183 | Price | June 26, 1945 |

FOREIGN PATENTS

| Number | Country | Date |
| --- | --- | --- |
| 492,645 | Great Britain | Sept. 23, 1938 |